C. A. FREIHOFER AND J. F. SCHMIDT.
PAN GREASING MACHINE.
APPLICATION FILED DEC. 6, 1918.

1,404,592.

Patented Jan. 24, 1922.
6 SHEETS—SHEET 1.

Inventors:
Charles A. Freihofer,
Joseph F. Schmidt,
by their Attorneys,
Howson & Howson

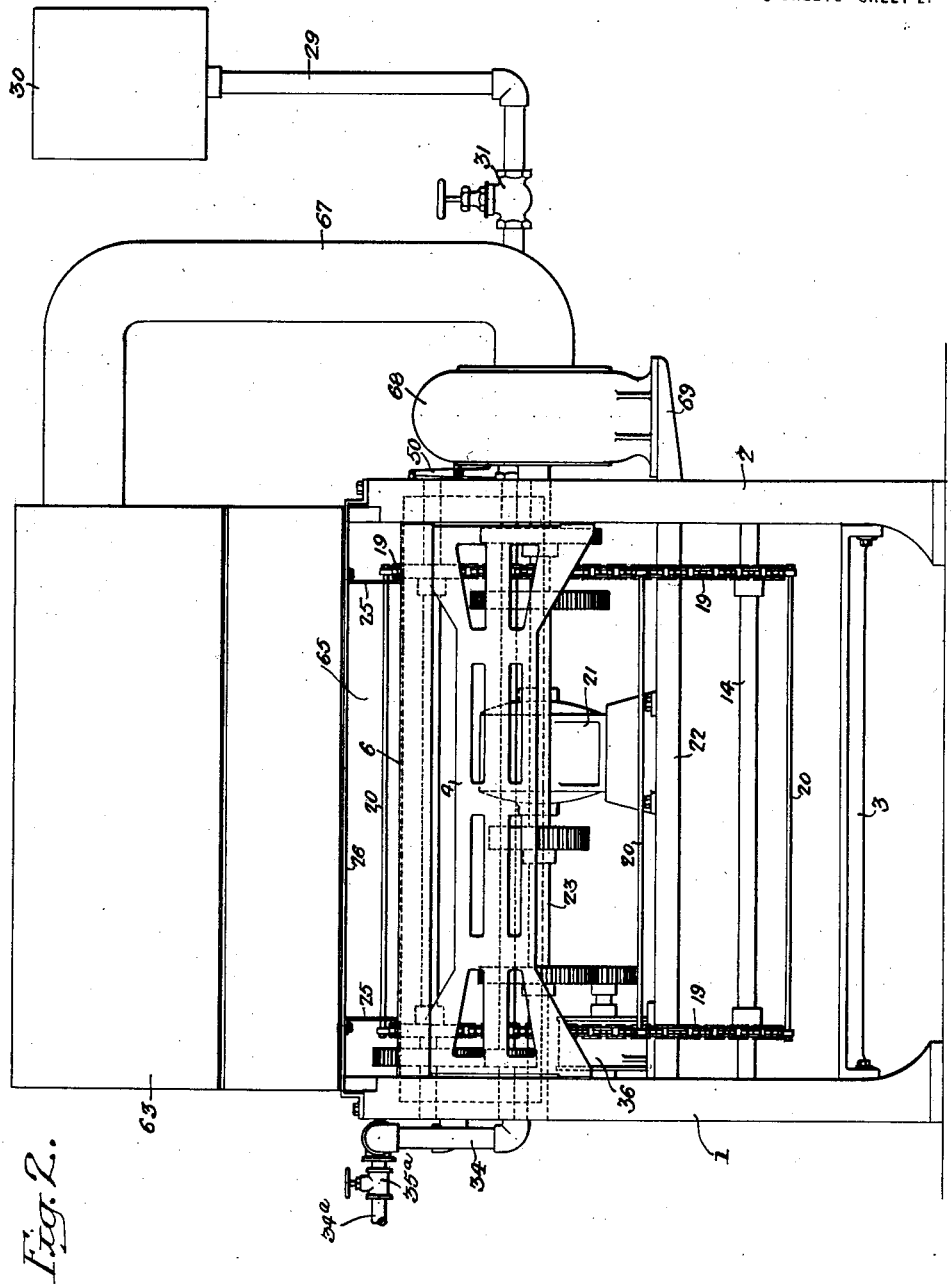

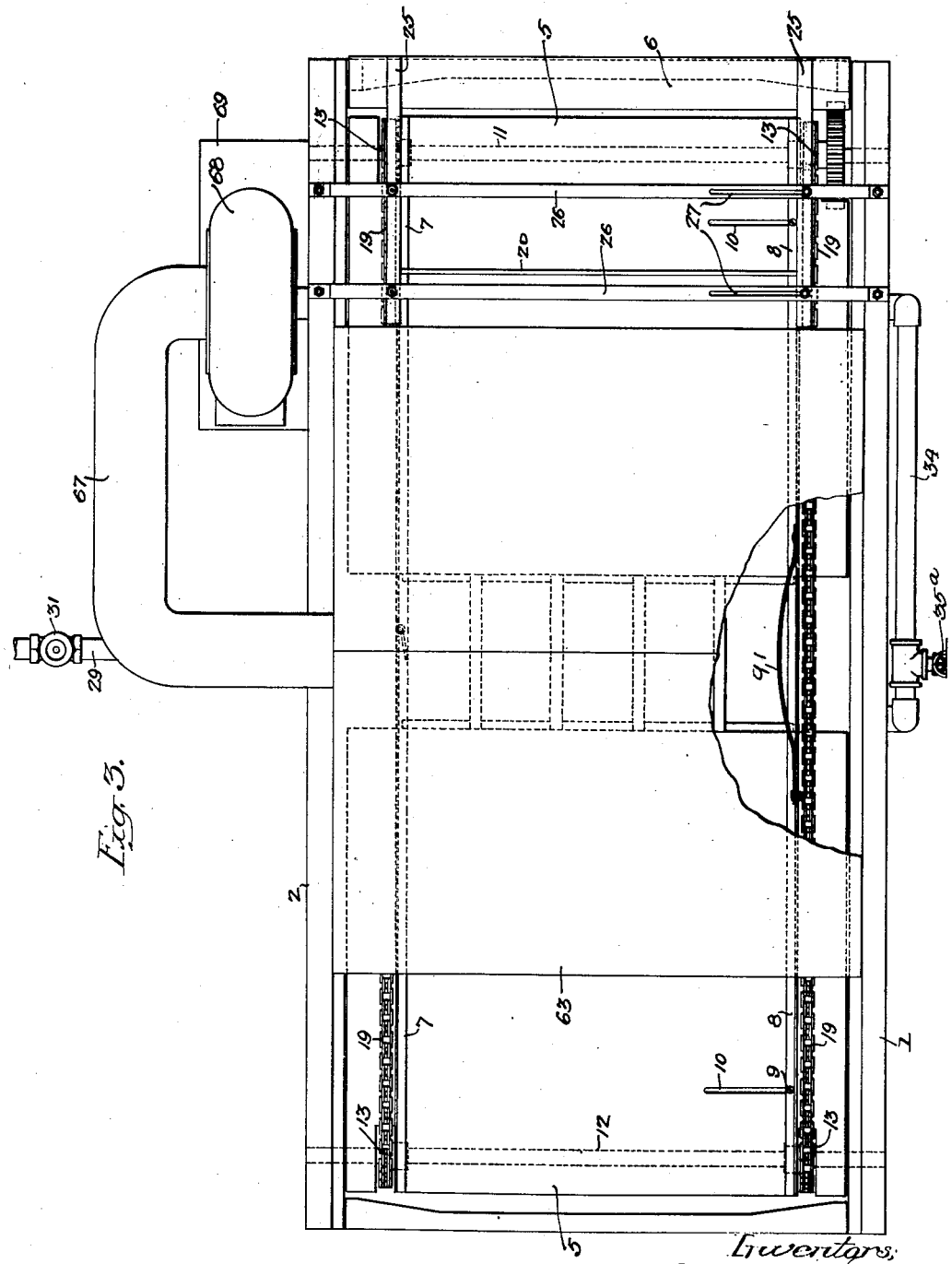

C. A. FREIHOFER AND J. F. SCHMIDT.
PAN GREASING MACHINE.
APPLICATION FILED DEC. 6, 1918.
1,404,592.  
Patented Jan. 24, 1922.  
6 SHEETS—SHEET 4.
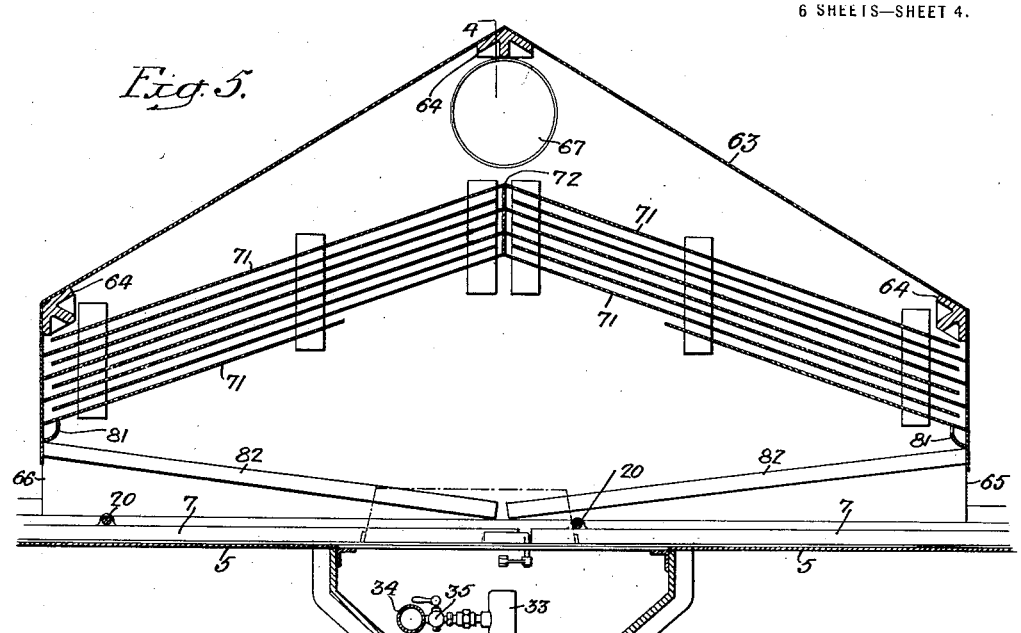
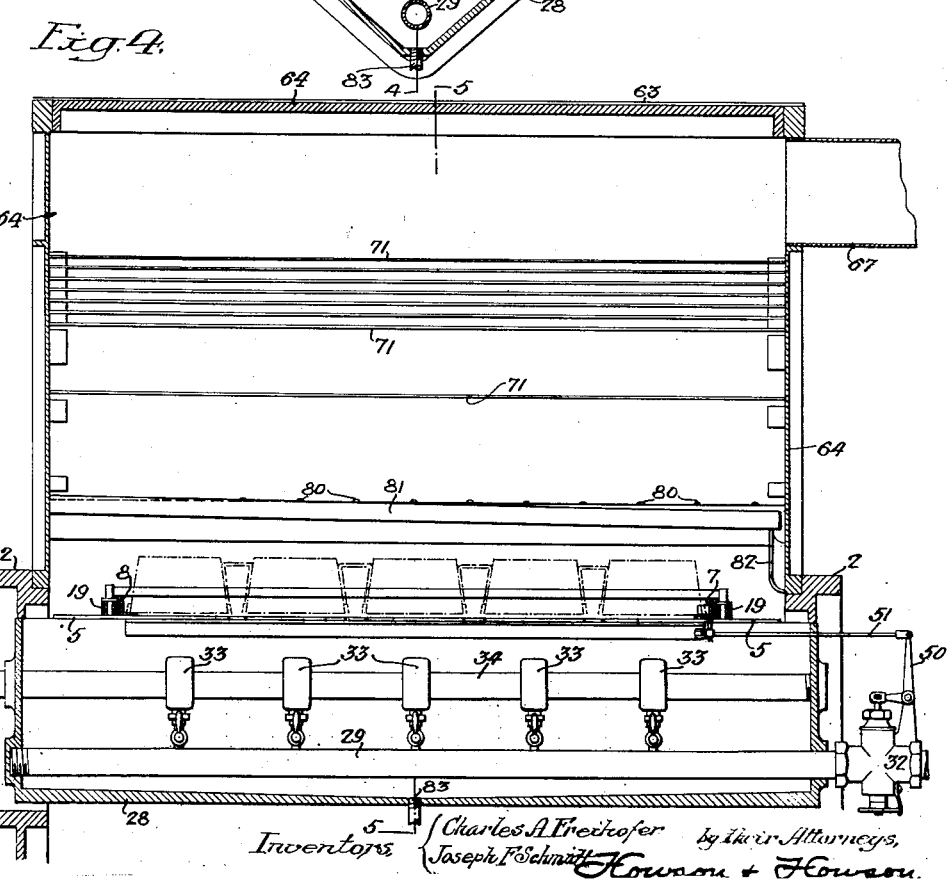

C. A. FREIHOFER AND J. F. SCHMIDT.
PAN GREASING MACHINE.
APPLICATION FILED DEC. 6, 1918.
1,404,592.
Patented Jan. 24, 1922.
6 SHEETS—SHEET 5.
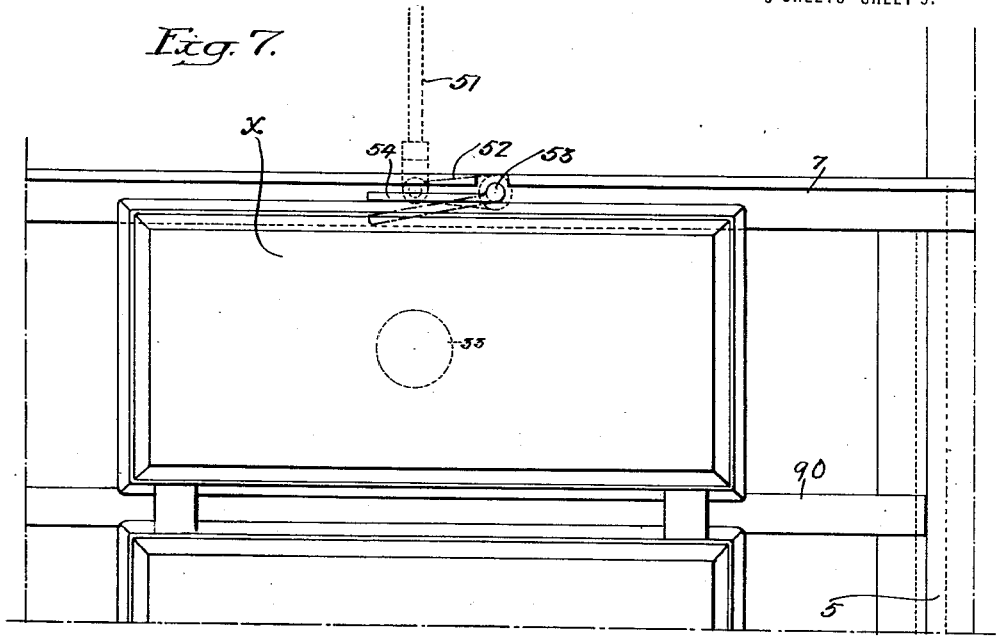
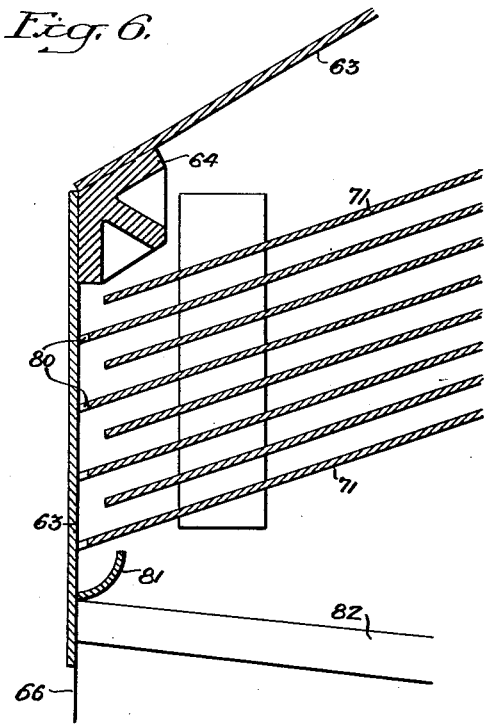
Inventors,
Charles A. Freihofer,
Joseph F. Schmidt,
by their Attorneys,
Howson & Howson

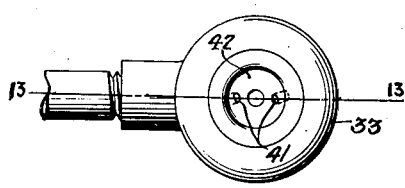
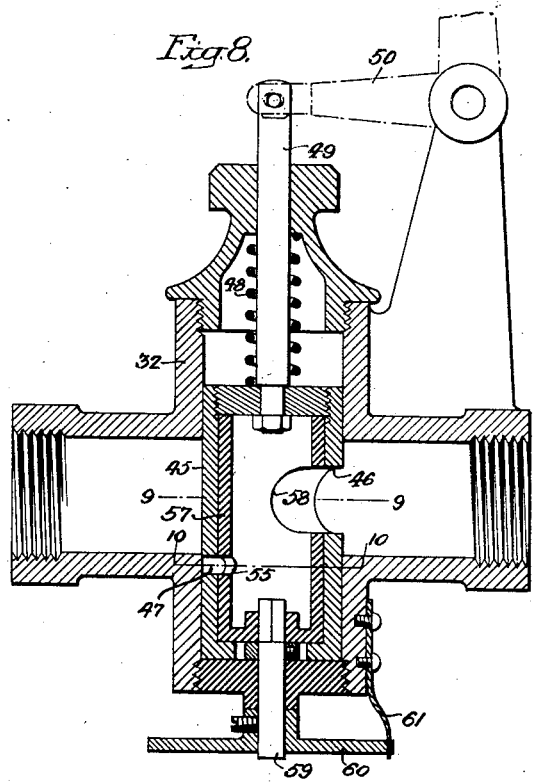
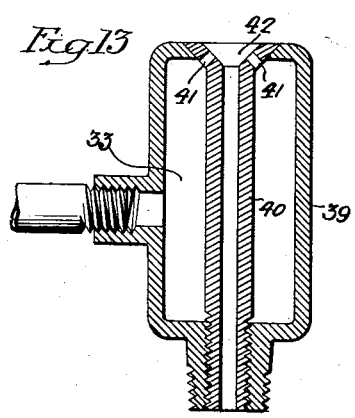
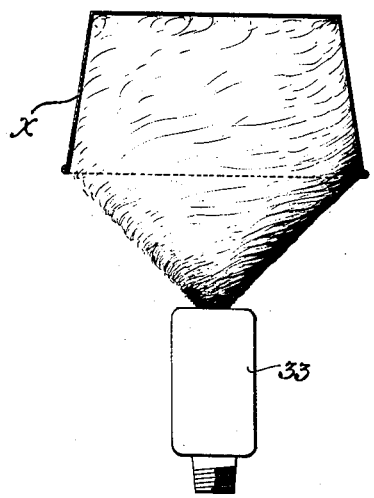
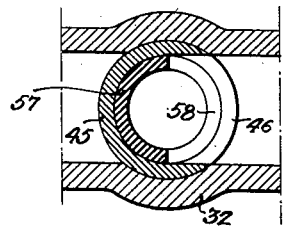
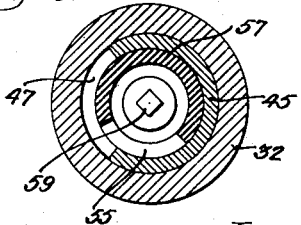

UNITED STATES PATENT OFFICE.

CHARLES ALBERT FREIHOFER AND JOSEPH FRANK SCHMIDT, OF PHILADELPHIA, PENNSYLVANIA.

PAN-GREASING MACHINE.

1,404,592.  Specification of Letters Patent.  Patented Jan. 24, 1922.

Application filed December 6, 1918. Serial No. 265,560.

*To all whom it may concern:*

Be it known that we, CHARLES ALBERT FREIHOFER and JOSEPH FRANK SCHMIDT, citizens of the United States, residing in Philadelphia, Pennsylvania, have invented the Pan-Greasing Machine of which the following is a specification.

One object of this invention is to provide a machine for automatically applying a film or coating of oil or grease to pans in which bread, cake, etc., is to be baked, which machine shall be simple and substantial in construction, quick and economical in operation and of such a nature as to run for long periods of time with a minimum of attention.

It is further desired to provide a machine of the above class with means for utilizing compressed air for finely dividing and applying oil to a succession of pans or sets of pans and thereafter separating and collecting the surplus particles of oil from the air so that this may be discharged directly into the atmosphere without objectionable results or waste of oil.

Another object of the invention is to provide an oil applying machine with a novel arrangement of atomizing nozzles and enclosing receptacle together with an automatic device whereby oil is delivered to the pans only when these are in the positions to receive it;—the construction being such as to permit of adjustment to permit of operation on pans of varying widths.

We also desire to provide a novel combination of pan conveyor, oil atomizer and baffle chamber whereby the interior surfaces of a succession of pans may be uniformly covered with a film of oil carried by air under pressure, which air is treated before delivery to the atmosphere in order to free it from any oil which it may still carry.

The invention also contemplates a form of atomizer, which in addition to being relatively simple and substantial in construction, shall be capable of rapidly and completely atomizing liquid such as oil, together with a novel device for so controlling the flow of liquid to such atomizer as to cause the amount of liquid to be maintained constant irrespective of the extent to which the atomizer is operated;—the invention contemplating an adjustable pan-controlled, liquid supply valve, so designed and mounted that the flow through it is constant after it has been opened, regardless of the distance through which the movable valve element has been moved by the pans.

Another object of our invention is to provide a novel device for separating finely divided liquid from air, so associated with a conveying mechanism and with liquid atomizing means that the escape into the atmosphere of material amounts of atomized liquid shall be effectually prevented.

These objects and other advantageous ends we attain as hereinafter set forth, reference being had to the accompanying drawings, in which, Fig. 1 is a side elevation of a pan greasing machine constructed in accordance with our invention;

Figs. 2 and 3 are respectively a front elevation and a plan of the machine shown in Fig. 1;

Fig. 4 is a transverse vertical section on the line 4—4, Fig. 1;

Fig. 5 is a vertical section on the line 5—5, Fig. 4;

Fig. 6 is a fragmentary vertical section illustrating the detail construction of certain features of the liquid separator forming part of our machine;

Fig. 7 is a plan illustrating the mechanism for controlling the supply of oil to the atomizers;

Fig. 8 is a vertical section illustrating the detail construction of the oil controlling valve;

Figure 1:
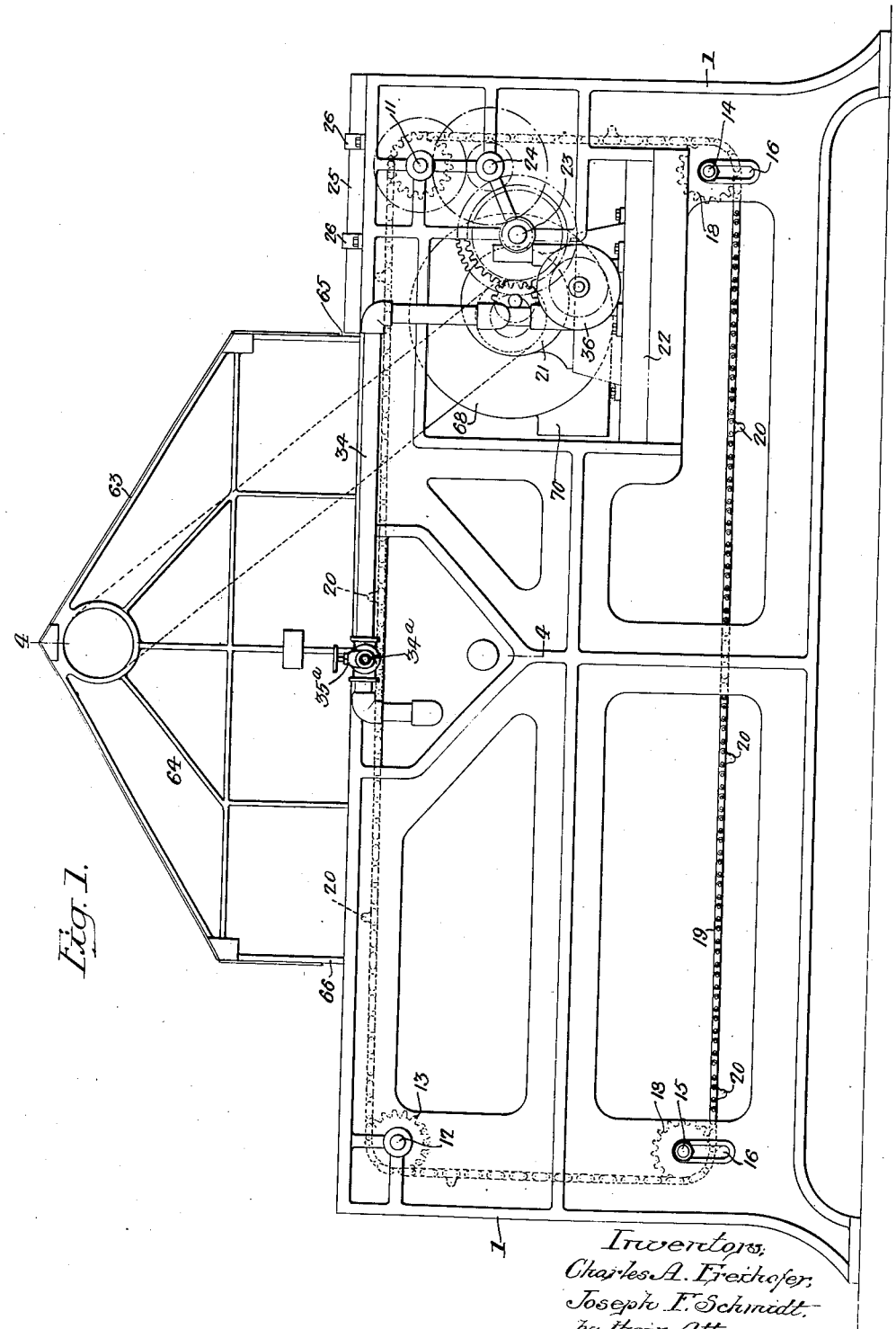

Figs. 9 and 10 are transverse sections on the lines 9—9 and 10—10, Fig. 8;

Fig. 11 is a side elevation, partly in section and to some extent diagrammatic, illustrating the relative positions of one of the nozzles and the pan which it supplies with atomized liquid;

Fig. 12 is a plan of one of the atomizing nozzles; and

Fig. 13 is a vertical section on the line 13—13, Fig. 12.

In the above drawings 1 and 2 represent the side frame castings of our machine which are rigidly connected by suitable transverse members such as those indicated at 3 and 4 and support a flat top 5 of sheet metal extending horizontally between them from points adjacent the front and rear ends of the machine. At the front of said machine an angular body of sheet metal 6 is placed to extend over the top and front parts of the transverse frame member 4 at the same level as and extended to within a short distance of the forward end of the flap top 5, so as to provide a pan receiving plate. Extending from near the front to rear of the machine upon opposite sides of the flat top 5 are a pair of tracks 7 and 8 preferably formed of angle sections of which the first is bolted, screwed or otherwise rigidly held in place adjacent one side of the machine while the other is adjustably clamped to the top 5 by screws or bolts 9 operative in elongated slots 10 in said top so as to be movable toward and from the track 7 in order to accommodate the machine for operation with pans of varying dimensions.

Suitably journaled in bearings provided at the top of the front and rear of the side members 1 and 2 are a pair of transverse shafts 11 and 12 each of which has fixed to or mounted on it a pair of sprocket wheels 13. Two other shafts 14 and 15 are mounted directly under these first shafts 11 and 12 respectively so as to be adjustable in the side frame members toward and from them, for which purpose they are placed in elongated slots 16. Each of these latter shafts 14 and 15 has mounted on it a pair of sprocket wheels 18, and two endless sprocket chains 19 extend around these wheels and the wheels 13, forming with rods 20 which extend between them at intervals, a conveyor for moving pans through the machine. The shafts 11 and 12 are so mounted as to move the top runs of the sprocket chains immediately above the flat top 5 so that they rest upon and slide over the same immediately outside of the angle iron tracks 7 and 8, with their connecting bars 20 immediately above said tracks.

For driving this pan conveyor we provide a suitable electric motor 21 upon a platform 22 carried by the side frame members 1 and 2, and through suitable gears, drive from it a main shaft 23. Through a second series of gears and a counter shaft 24 power is transmitted from the main shaft to the shaft 11 to which are fixed the front sprockets 13, so that these and with them the pan conveyor, will be operated when the motor is run. The tension of the conveyor chain may be regulated and any wear taken up by adjusting the shafts 14 and 15 in their slots 16 relatively to the shafts 11 and 12. The front vertical run of the pan conveyor passes into the top horizontal portion thereof through suitable openings in the flat top 5, so that a series of pans placed upon the horizontal portion of the receiving plate 6 and thereafter moved rearwardly onto said top are shortly engaged by one of the connecting rods 20 of the conveyor and are moved rearwardly through the machine.

For insuring that the pans are properly positioned on the receiving plate and on the front portion of the top plate, relatively to the conveyor, we provide two guides in the form of channel shaped members 25 substantially in line with the tracks 7 and 8 and extending from the front edge of the receiving plate 6 to the front end of the atomizing casing. For supporting these guides 25 in the desired positions with their webs substantially within the vertical planes including the vertical portions of the tracks 7 and 8, we provide two bridge pieces 26 extending between the side frame members 1 and 2 of the machine across the top of the same, and bolt or otherwise secure said channel shaped guides to them as shown in Figs. 2 and 3. While the forward ends of these guides rest upon the receiving plate 6, they are necessarily cut away to the rear of this plate to provide for the passage of the cross bars 20 of the pan conveyor.

The bridge pieces 26 are provided with elongated slots 27 for the reception of the bolts whereby one of the guides 25 is adjustably mounted so that it may be moved toward or from the other guide to suit pans of different dimensions, it being noted that the latter must be moved through the machine without having substantial lateral movement in order to properly operate the oil controlling valve as hereafter explained.

At about the middle part of the machine we provide a pan or receptacle 28 suspended between the side frame members 1 and 2, with its top at the level of the top plate 5 which is cut away to receive it (Figs. 4 and 5). Extending transversely of the machine adjacent the bottom of this receptacle which is of approximately triangular section, is an oil supply pipe 29 leading from a tank 30 or other source of supply outside of the machine. This pipe 29 preferably has connected in it a stop valve 31 and a controlling valve 32, the latter being placed in the present instance, immediately adjacent one end of said receptacle. Within the latter and supported by said pipe are a series of atomizing nozzles 33 having cocks or stop valves 33ª whereby the number of such nozzles in service may be conveniently controlled. Each of the nozzles through a cock or valve 35 is likewise connected to an air pipe 34 which is connected to a rotary blower or pump 36 supported on the platform 22 and driven through suitable gearing from the main shaft 23.

The nozzles which we have found to give the most satisfactory results under operating conditions are constructed as shown in Figs. 12 and 13, being made in the form of hollow vertical cylinders 39, each having mounted coaxially within it an oil supply tube 40. This latter is preferably threaded into the nipple extension of the base of its cylinder which in turn is externally threaded for attachment to the valve 33ᵃ, and the upper end of each tube is funnel shaped or flared, having its sides provided with perforations 41 opening into the hollow interior of the cylinder. This latter is formed with a circular bevel edged opening for the reception of the funnel shaped end of the tube and it is noted that the passages 41 enter the conical depression or cavity in the top of this tube in parallel planes which pass on opposite sides of the center line of said cavity and of the passage opening into the bottom thereof. As a result, when liquid is supplied to the tube 40 and air under pressure is delivered to the hollow interior of the cylindrical body of the nozzle, said oil flows into the bottom of the cavity 42 and rises therein to and slightly above the openings of the passages 41. As the air under pressure is delivered in two parallel streams, it so acts upon this liquid as to give it a rotary movement and at the same time finely divide or atomize it, forming inverted conical bodies of finely atomized liquid and air directed upwardly from the several nozzles.

For controlling the flow of oil to the pipe 29 and thence to the nozzles, we provide the valve 32 with a vertically slidable member 45 of hollow cylindrical form having a side port or opening 46 of relatively large size. whereby its interior is at all times maintained in free communication with that branch of the pipe 29 leading to the reservoir 30. A second port 47 is so placed in the side of said member 45 as to be normally maintained, by means of a spring 48, at such a position in the casing of the valve 32 as to be cut off from that branch of the pipe 29 leading to the various nozzles. When however by means of a stem 49 attached to the member 45, this is moved vertically upward, far enough to uncover said second port, free communication is established between the two branches of the pipe.

For actuating the movable valve member 45 I pivot a bell crank lever 50 on the valve casing 32 and connect one arm thereof to the stem 49. The second arm of said lever is connected through a link 51 to an arm 52 fixed to a short vertical spindle 53 journaled in one of the pan guides 7 and having a horizontal arm 54 normally extending adjacent one of the tracks into the path of movement of one of the pans x to be greased. On the opposite side of the machine adjacent the other track is a bowed spring strip 91 so positioned as to force over the successive sets of connected pans so that they will certainly engage and operate the arm 54.

The arrangement of parts is such that when this lever is struck by the pan and moved into the position shown in full lines in Fig. 7, the consequent movement of the link 51 and of the bell crank lever raises the stem 49 and with it the valve member 45 so as to permit flow of liquid through the ports of the latter. Obviously after such communication is once established, it is immaterial how far the movable member 45 is raised, for in any case the valve is open to its fullest extent so that the supply of liquid passing through it is constant.

In order to adjust the flow through the port 47 the latter (Fig. 10) is given the form of an elongated slot and communicates with the interior of the movable member through a port 55 in a sleeve 57 rotatably mounted within said member. The inlet port 46 (Fig. 9) is also elongated circumferentially of the member 45 and the regulating sleeve 57 is provided with a second elongated port 58 preferably having an angular length of 180°. The two outlet ports 55 and 47 are about 90° in angular length, so that a rotation of the sleeve 57 relatively to the valve member 45 will vary the cross section of the passage formed by the two ports 55 and 47, without materially affecting the flow of liquid through the inlet ports 46 and 58. For thus turning the sleeve I extend a short spindle 59 through the bottom of the casing of the valve 32 and square its upper end to nonrotatably engage said sleeve, fixing to the lower end an adjusting wheel or handle 60. The edge of this wheel is preferably notched to coact with a pointer 61 fixed to the valve casing, in such manner as to indicate the extent of the opening of the outlet passage 55–47. A grating or bridge 90 is mounted over and is preferably carried by the top of the receptacle 28 in a position substantially flush with the tracks so as to support the pans while they are moved over the nozzles by the conveyor.

For confining and condensing the vapors or atomized particles delivered from the nozzles after the air carried oil or grease has acted on the pans, I provide a hood or casing 63 extending both to the front and rear of the receptacle 28 and from side to side of the machine. Said hood consists of a cast or other frame structure 64 having a sheet metal covering closely fitted to the side frame members 1 and 2 and completely closed except at the lower part of its front face, where an opening 65 is formed of a size just sufficient to permit passage of a set of the baking pans to be greased. At the rear of the hood is an outlet opening 66 and it is noted that both of these openings are some distance from the nozzles and from the receptacle 28 in which they are mounted so that there is no possibility of a direct passage of the atomized oil through them. The top of the hood is connected through a pipe 67 to the inlet of an exhaust fan or suction device 68, mounted in the present instance on a bracket 69 projecting at one side of the frame member 2, in such position that the shaft carrying its movable member may be driven through suitable gearing from the motor driven main shaft 23.

The outlet 70 of the exhaust fan delivers into the space under the receptacle 28 and in order to prevent the air so discharged from carrying with it the atomized oil not deposited on the pans, I mount within the hood 63 a number of series of inclined partitions or baffles 71, as shown in Figs. 5 and 6. These baffles are in the form of flat plates or sheets each extending completely across the hood 63 and either downwardly from a central vertical plate 72 to within a short distance of the front or back walls of the hood or upwardly from such front or back wall to within a short distance of said vertical plate;—each set of the sheets connected to the central plate being alternated with those connected to the front or back hood walls. There are thus formed two tortuous passages between the lower part of the hood into which the atomized oil and air under pressure are discharged from the nozzles 33, and the upper part of the hood from which the conduit 67 leads to the exhausting device 68 and it is noted that these channels or passageways provide relatively extended surfaces over which the air passing through them is forced to flow and include also sharp turns so that the liquid particles carried by the air sooner or later strike the plates and cling thereto. As these liquid particles flow together they ultimately reach a size sufficient to cause them to flow down the plates 71 under the action of gravity toward either the front or back wall of the hood 63 so that they finally pass through openings 80 (Fig. 6) in said plates and flow down said walls into either of two gutters or troughs 81 respectively on the front and rear walls of the hood. These are suitably inclined so as to empty into two other troughs or conductors 82 mounted on one of the side walls of the casing and inclined downwardly toward each other so as to discharge into the receptacle 28, from the bottom of which a drain pipe 83 leads to any convenient vessel for collecting the oil from said troughs and also that which may drip from the pans.

As will be understood by those skilled in the art, the pans commonly used in large baking establishments are usually connected in series of two, three or five, and are arranged with their long axes parallel. Prior to putting the machine in operation we therefore so set the adjustable pan-supporting track 8 and also the adjustable side guide 25 as to suit them to the width of the particular series of pans to be greased which in the case shown consists of five pans.

In setting the machine in operation the motor 21 is started so that the pan conveyor is actuated, the exhauster is caused to draw the air from the interior of the casing 63 and the compressor 36 delivers air under pressure through the pipe 34 to the interior of the various nozzles from whence it escapes through the openings 41. No oil is delivered from the reservoir 30 since the spring 48 of the valve 32 normally holds the movable member 45 in its lower position with the port 47 cut off from the outlet branch of the pipe 29. Since a maximum number of pans is to be greased, the sleeve 57 is so set as to permit a corresponding maximum flow of liquid through the outlet passage 55—47 of the movable valve member and all of the cocks 33ª between the pipe 29 and the several nozzles 33 as well as all of the cocks 35 are opened; the nozzles being so positioned that each of them lies in a vertical plane passing through the line of movement of one of the pans or pan sections.

One of the series of pans to be greased is now placed in an inverted position upon the receiving plate 6 and is thereafter pushed rearwardly between the guideways 25 until it rests upon the horizontal webs of the angle tracks 7—8. Shortly thereafter the operation of the conveyor causes one of the transverse rods 20 to engage this series of pans and move it toward the rear of the machine through the opening 65 into the casing 63. When the advancing edge of the pan at the right hand end of the series strikes the arm 54, the front edges of all the pans are just moving over the nozzles 33 respectively and the resulting movement of said arm raises the movable member 45 of the valve 32, permitting oil to flow from the reservoir 30 into the pipe 29 and rise through the tubes 40 of the several nozzles, into the cavities 42 thereof. Upon reaching these cavities, said oil is struck and atomized by the jets of air issuing from the openings 41 and as before explained, is given a rotary movement within a generally conical surface.

The angle of the sides of each of the cavities 42 and the distance of the several nozzles 33 from the pans is such that by the time each conical mass of atomized oil and air reaches the downwardly opening pan above it, its diameter is substantially equal to the width of said pan, so that as indicated in Fig. 11 it enters and strikes all parts of the walls and bottom of the pan as this is moved rearwardly over it. As soon as the pan which rests on the track 7, passes out of engagement with the arm 54, this is moved into the position indicated in dotted lines in Fig. 7 under the action of the spring 48, which also causes the movable member 45 of the valve 32 to close and thus cut off the supply of oil to the nozzles.

Owing to the exhaustion of the air from the upper part of the casing 63 by means of the exhaust fan 68, all of the air discharged from the various nozzles is drawn through the passages defined by the baffle plates 71, and the various parts are so proportioned as to prevent practically any of such air flowing out of the hood through the openings 65 and 66 thereof. In flowing between the baffle plate 71 the air is caused to deposit upon them all of the atomized oil which it still carries, so that when it enters and is discharged from the exhaust fan it carries practically no oil with it.

The pans so passed over the atomizing nozzles are found to have their internal surfaces evenly and uniformly coated with the oil or grease in the manner desired in the bread or cake baking art and it is obvious that the above described cycle of operations is repeated each time a series of pans is moved by the conveyor through the casing 63. Obviously there can be no surplus of oil or grease carried away by any of the pans since even though more than is desired should flow into them from the nozzles this would run out into the receptacle 28, owing to their inverted positions.

If a less number of pans than five be used in each series, or if the width of another series is different from that shown, the tracks and guideways 8 and 25 may be adjusted so that their distance from the tracks and guides 7 and 25 corresponds to the width of said pans, and if each series contains four instead of five pans for example, that one of the nozzles 33 nearest the adjustable guides may be cut out of service by closing its oil and air cocks 33a and 35 and at the same time the adjustable sleeve 57 may be turned by means of the handle 60 so as to diminish the cross section of the passage 55—47 to correspondingly cut down the quantity of oil delivered to the nozzles.

While in the foregoing description I have referred to oil as the material delivered from the nozzles, it is to be understood that by this term is meant and included the oleaginous or greasy material such as is customarily employed by bakers for preventing sticking of dough or similar material in pans or tins.

The grating or pan bridge 90 (Fig. 7) is so constructed that its members engage the adjacent longitudinal edges of the pans of each series in such positions as to cover the spaces or openings between them, thereby preventing the atomized oil passing up from the nozzles between said pans and lodging on their outside surfaces. These members are preferably formed of strip material or flat bars and extend from front to rear across the receptacle 28.

In order to conveniently and effectively clean the interior of the machine and remove oil which may have solidified upon or adhered to the baffles, nozzles and interior surfaces of the casing 63 and receptacle 28, we provide means such as the pipe 34a whereby live steam may be delivered to the machine. This pipe includes a valve 35a and is connected to supply steam from any suitable source to the air pipe 34 and thence through the nozzles to the interior of the casing 63. By this means the interior of the machine may be completely sterilized and heated, causing any solidified oil or grease to melt and run into the receptacle 28 from which it may be drawn off. By this means we are enabled to prevent objectionable accumulations of the grease and maintain the machine in a perfectly sanitary condition.

I claim:

1. The combination in a pan greasing machine of a pan conveyor; an oil atomizer; a conduit to supply oil to said atomizer; a valve in the conduit having a normally closed port and including a member free to move after said port has been fully opened; with a pan controlled device for actuating said member when a pan is in position to receive oil from the atomizer.

2. The combination in a pan greasing machine of a receptacle; oil atomizing nozzles in said receptacle; means for conveying a succession of series of connected pans over the receptacle; and bridge pieces extending in the direction of movement of the conveyor positioned to prevent oil from the nozzles passing up between adjacent pans of each series while they are over the receptacle.

In witness whereof we affix our signatu .

CHARLES ALBERT FREIHOFER.
JOSEPH FRANK SCHMIDT.